United States Patent
Lindoff et al.

(10) Patent No.: US 11,133,902 B2
(45) Date of Patent: Sep. 28, 2021

(54) SCHEDULING DATA TRANSMISSIONS BETWEEN A MOBILE TERMINAL AND A BASE STATION IN A WIRELESS COMMUNICATIONS NETWORK USING COMPONENT CARRIERS

(71) Applicant: IDTP Holdings, Inc., Wilmington, DE (US)

(72) Inventors: Bengt Lindoff, Bjärred (SE); Stefan Andersson, Lund (SE); Ylva Jading, Stockholm (SE); Stefan Parkvall, Stockholm (SE); Lars Sundström, Lund (SE)

(73) Assignee: IDTP Holdings, Inc., Wilmington, DE (US)

( * ) Notice: Subject to any disclaimer, the term of this patent is extended or adjusted under 35 U.S.C. 154(b) by 0 days.

(21) Appl. No.: 16/891,910

(22) Filed: Jun. 3, 2020

(65) Prior Publication Data
US 2020/0295889 A1    Sep. 17, 2020

Related U.S. Application Data (63) Continuation of application No. 13/378,021, filed as application No. PCT/EP2010/057533 on May 31, 2010, now abandoned.

(Continued)

(30) Foreign Application Priority Data

Jun. 17, 2009   (EP) .................................... 09162932

(51) Int. Cl.
*H04L 5/00*   (2006.01)
*H04W 72/02*   (2009.01)
(Continued)

(52) U.S. Cl.
CPC .............. *H04L 5/001* (2013.01); *H04L 5/023* (2013.01); *H04W 72/02* (2013.01);
(Continued)

(58) Field of Classification Search
CPC ....... H04L 5/001; H04L 5/006; H04L 5/0085; H04L 5/0087; H04L 5/023; H04W 28/20;
(Continued)

(56) References Cited

U.S. PATENT DOCUMENTS

| | | |
|---|---|---|
| 5,974,327 A | 10/1999 | Agrawal et al. |
| 6,510,148 B1 | 1/2003 | Honkasalo |

(Continued)

FOREIGN PATENT DOCUMENTS

| | | |
|---|---|---|
| EP | 1705947 A1 | 9/2006 |
| EP | 1811794 A1 | 7/2007 |

(Continued)

OTHER PUBLICATIONS

3rd Generation Partnership Project (3GPP), R1-091781, "Support of Carrier Aggregation for FDD and Related Control Signalling", Alcatel-Lucent, 3GPP TSG RAN WG1 #57 Meeting, San Francisco, USA, May 4-8, 2009, pp. 1-5.

(Continued)

*Primary Examiner* — Kan Yuen
(74) *Attorney, Agent, or Firm* — Condo Roccia Koptiw LLP (57) ABSTRACT

A method of scheduling wireless data transmissions between a mobile terminal (701) and a base station using multiple component carrier signals is disclosed. The method comprises the steps of: receiving in the mobile terminal information from the base station indicating available component carriers; detecting in the mobile terminal at least one dynamic parameter indicative of the mobile terminal's current ability to handle component carriers having non-con- (Continued)

tiguous bandwidths; determining in the mobile terminal in dependence of the at least one dynamic parameter which of the available component carriers to utilize; and transmitting from the mobile terminal to the base station information indicating the component carriers determined to utilize. By doing this the mobile terminal may choose to limit the number of component carriers used in situations where it is disadvantageous, such as situations where the power consumption of supporting multiple component carriers is high or situations where complex hardware is needed.

20 Claims, 5 Drawing Sheets

Related U.S. Application Data (60) Provisional application No. 61/221,193, filed on Jun. 29, 2009.

(51) Int. Cl.
| | | |
|---|---|---|
| *H04W 72/04* | (2009.01) | |
| *H04L 5/02* | (2006.01) | |
| *H04W 28/20* | (2009.01) | |
| *H04W 52/02* | (2009.01) | |

(52) U.S. Cl.
CPC ......... *H04W 72/048* (2013.01); *H04W 28/20* (2013.01); *H04W 52/0277* (2013.01); *Y02D 30/70* (2020.08)

(58) Field of Classification Search
CPC .......... H04W 52/343; H04W 52/0277; H04W 72/02; H04W 72/0473; H04W 72/048; H04W 72/0486; Y02D 30/70
See application file for complete search history.

(56) References Cited

U.S. PATENT DOCUMENTS

| | | | |
|---|---|---|---|
| 7,697,954 | B2 | 4/2010 | Kwak et al. |
| 8,010,167 | B2 | 8/2011 | Cotevino et al. |
| 8,270,435 | B2 | 9/2012 | Olszewski |
| 8,780,833 | B2* | 7/2014 | Kim ................. H04L 5/0048 370/329 |
| 2004/0102177 | A1 | 5/2004 | Otsuka |
| 2005/0114721 | A1 | 5/2005 | Azadet et al. |
| 2005/0130666 | A1 | 6/2005 | Levy et al. |
| 2005/0255892 | A1 | 11/2005 | Wong et al. |
| 2005/0255893 | A1 | 11/2005 | Jin et al. |
| 2007/0070908 | A1 | 3/2007 | Ghosh et al. |
| 2008/0137634 | A1 | 6/2008 | Hassan et al. |
| 2008/0192666 | A1 | 8/2008 | Koskan et al. |
| 2009/0190535 | A1 | 7/2009 | Hassan et al. |
| 2010/0197339 | A1* | 8/2010 | Pedersen ............... H04W 52/34 455/522 |
| 2010/0272051 | A1 | 10/2010 | Fu et al. |
| 2011/0117907 | A1 | 5/2011 | Hooli et al. |
| 2012/0077445 | A1 | 3/2012 | Konno et al. |
| 2012/0170485 | A1 | 7/2012 | Maeda et al. |

FOREIGN PATENT DOCUMENTS

| | | |
|---|---|---|
| WO | 2010/124192 A2 | 10/2010 |
| WO | 2010/140347 A1 | 12/2010 |

OTHER PUBLICATIONS

3rd Generation Partnership Project (3GPP), R2-092874, "LTE-A MAC for Multiple Component Carriers", HTC Corporation, 3GPP TSG-RAN WG2 #66, San Francisco, USA, May 4-8, 2009, pp. 1-2.
3rd Generation Partnership Project (3GPP), R2-092958, "Control Plane Aspects of Carrier Aggregation", Ericsson, 3GPP TSG RAN WG2 #66, San Francisco, USA, May 4-8, 2009, pp. 1-4.

\* cited by examiner

SCHEDULING DATA TRANSMISSIONS BETWEEN A MOBILE TERMINAL AND A BASE STATION IN A WIRELESS COMMUNICATIONS NETWORK USING COMPONENT CARRIERS

CROSS-REFERENCE TO RELATED APPLICATIONS

This application is a continuation of U.S. Ser. No. 13/378,021, filed Feb. 2, 2012, which is the National Stage Entry under 35 U.S.C. § 371 of Patent Cooperation Treaty Application No. PCT/EP2010/057533, filed May 31, 2010; which claims the benefit of European Patent Application No. 09162932.9 filed Jun. 17, 2009 and U.S. Ser. No. 61/221,193 filed Jun. 29, 2009; all of which are incorporated by reference herein as if fully set forth in their entireties.

TECHNICAL FIELD

The invention relates to methods and devices for scheduling data transmissions between a mobile terminal and a base station in a wireless communications network arranged for the transmission of multiple component carrier signals.

BACKGROUND

With each generation, wireless communication systems are characterized by ever-higher data rates. While some increase in data rates may be attributed to improvements in modulation, coding, and the like, significant increases in data rates generally require higher system bandwidths. For example, the International Mobile Telecommunications, IMT, advanced (a proposed fourth generation (4G) wireless communication system), mentions bandwidths up to 100 MHz. However, the radio spectrum is a limited resource, and since many operators and systems compete for limited radio resources, it is unlikely that 100 MHz of contiguous spectrum will be free for such systems.

One approach to increasing bandwidth requirements in limited, fragmented spectrum is to aggregate non-contiguous spectrum. From a baseband point of view, this can effectively increase the system bandwidth sufficiently to support up to 1 Gb/s, a throughput requirement for 4G systems. Transmitting data in non-contiguous parts of the spectrum also introduces flexibility, as spectrum utilization may be adapted to existing spectrum use and geographical position. Additionally, different modulation and coding schemes may be advantageously applied to different portions of the spectrum.

A possible evolution of current cellular systems, such as the 3GPP Long Term Evolution (LTE), to support non-contiguous spectrum is to introduce multiple component carriers or multiple bands. In such a multi-band or multiple component carrier system, each separate portion of spectrum may be considered an LTE system. Multi-band transmission is likely to be a principal part of the further releases of 3G LTE targeting ITU IMT-Advanced capabilities. A mobile terminal for use in such a system will be capable of receiving multiple component carriers, of different bandwidths, and transmitted at different carrier frequencies.

US 2007/007090 discloses a multi-carrier communication system in which radio resources are distributed between a plurality of access terminals. The carriers assigned to an access terminal are determined by the network based on scheduling information received from the access terminal. The scheduling information may include data requirements, Quality-of-Service requirements, available transmit power headroom, the location of the access terminal, or hardware constraints associated with the access terminal. This disclosure does not relate to the use of non-contiguous bandwidths.

The design of a mobile terminal supporting multiple non-contiguous component carriers is non trivial task. The front end radio needs to be able to suppress blocking signal in between the spectrum "chunks". Different kind of radio architecture can be used for handling this problem; however, they typically have drawbacks compared to standard contiguous system receivers in terms of current consumption. Therefore there is a need for an efficient non-contiguous multi-carrier LTE system design taking into account the challenges in the mobile terminal front end receiver design.

SUMMARY

Therefore, it is an object of embodiments of the invention to provide a flexible method of scheduling data transmissions, which is more efficient and takes the mobile terminal's current ability to handle component carriers having non-contiguous bandwidths into account.

According to embodiments of the invention the object is achieved by using a method of scheduling data transmissions between a mobile terminal and a base station in a wireless communications network arranged for the transmission of multiple component carrier signals, each component carrier providing for the transmission of signals in a predetermined bandwidth around the carrier.

The method may comprise the steps of: receiving in the mobile terminal information from the base station indicating available component carriers, detecting in the mobile terminal at least one dynamic parameter indicative of the mobile terminal's current ability to handle component carriers having non-contiguous bandwidths, determining in the mobile terminal in dependence of said at least one dynamic parameter which of said available component carriers to utilize for said data transmissions and transmitting from the mobile terminal to the base station information indicating the component carriers determined to utilize for the data transmissions.

The mobile terminal may control the number of component carriers used, in relation to a dynamic parameter detected in the mobile terminal. By doing this the mobile terminal may choose to limit the number of component carriers used in situations where it is disadvantageous, such as situations where the power consumption of supporting multiple component carriers is high or situations where complex hardware is needed.

In one embodiment the method further comprises the step of selecting the at least one parameter from the group of parameters consisting of a parameter indicative of a charging level of a battery in the mobile terminal, a parameter indicative of a level of transmission power from the mobile terminal required to achieve a predetermined quality level of data transfer from the mobile terminal and a parameter indicative of a level of base band processing capability in the mobile terminal.

By letting the mobile terminal control the number of component carrier to use in respect to a parameter indicative of a charging level of a battery in the mobile terminal, a longer battery lifetime may be achieved. This may be done by limiting the use of multiple component carriers when the battery charging level is low, thereby saving the power needed to support multiple component carriers. Additionally a simpler design of the mobile terminal may be used since there is no need for supporting multiple component carriers at a low battery voltage.

By letting the parameter be indicative of a level of transmission power from the mobile terminal, to achieve a predetermined quality level of data transfer, a simpler design of the mobile terminal may be used, since the mobile terminal does not have to support multiple component carriers when transmitting with a high power. This may be achieved by limiting the number of component carriers used when transmitting with a high power.

By letting the parameter be indicative of a level of base band processing capability in the mobile terminal a more efficient use of the processing resources in the mobile terminal may be achieved. This may be done by limiting the number of component carriers used when the processing resources in the mobile terminal is scarce.

In one embodiment the method further comprises the steps of detecting the occurrence of a component carrier event triggered by one of the parameter levels passing a predefined threshold; and performing the step of determining which component carriers to utilize when a component carrier event is detected.

By controlling the use of multiple component carriers in respect to an event triggered by the passing of a predetermined threshold by one of the parameter levels, an easy implementation of the method in a mobile terminal is made possible.

In one embodiment the step of transmitting the information indicating the determined component carriers uses a Radio Resource Control, RRC, signaling protocol.

In one embodiment the step of transmitting the information indicating the determined component carriers uses a Medium Access Control, MAC, signaling protocol.

Some embodiments of the invention relate to a mobile terminal configured to schedule data transmissions between the mobile terminal and a base station in a wireless communications network arranged for the transmission of multiple component carrier signals, each component carrier providing for the transmission of signals in a predetermined bandwidth around the carrier. The mobile terminal is configured to receive information from said base station indicating available component carriers; detect at least one dynamic parameter indicative of the mobile terminal's current ability to handle component carriers having non-contiguous bandwidths; determine in dependence of said at least one dynamic parameter which of said available component carriers to utilize for said data transmissions; and transmit to said base station information indicating the component carriers determined to utilize for said data transmissions.

Embodiments corresponding to those mentioned above for the method also apply for the mobile terminal.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION OF EMBODIMENTS

In a spectrum aggregated or multi-band system as is discussed herein, several frequency bands, contiguous or non-contiguous, may be allocated for the communication with one mobile receiver. The modulation and access format within the band could be of any kind, e.g., orthogonal frequency division multiplexing (OFDM), single-carrier frequency division multiplexing (SC-FDMA), code-division multiple access (CDMA) etc. In this application, we denote such a system "multiple component carrier system". In this context, one band is referred to as one "component carrier". It may also be noted that this type of system in some publications is called "multi-carrier", however this term is also commonly used to denote OFDM.

Figure 1:
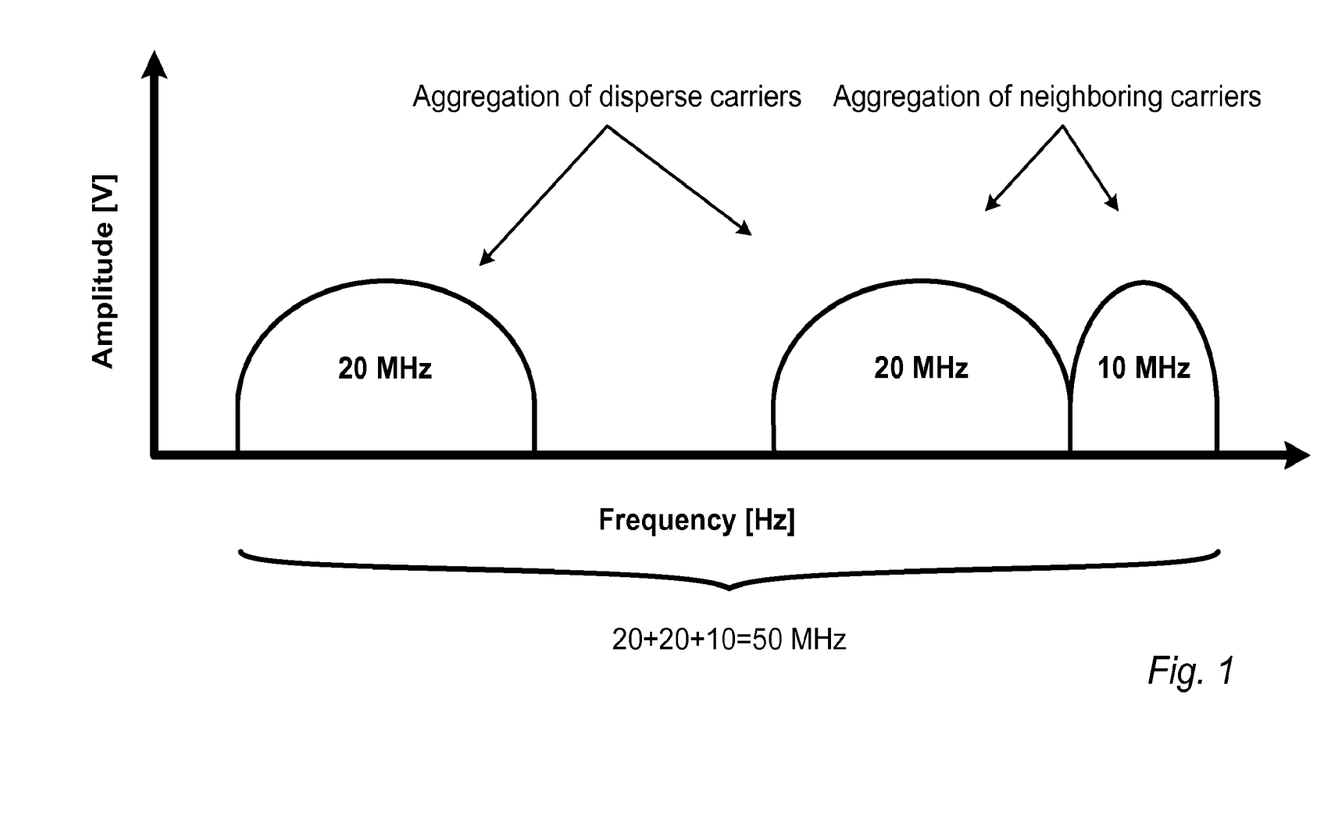
FIG. 1 is a frequency plot showing multiple component carriers.

FIG. 1 depicts an example of aggregation of component carriers to achieve greater bandwidth. It may be noted that the left-most component carrier is well spaced-apart in frequency to the other component carriers. It will experience, and cause, only a small amount of Inter carrier interference due to the wide carrier spacing. However, the two right most component carriers are not as well spaced apart in frequency.

Figure 2:
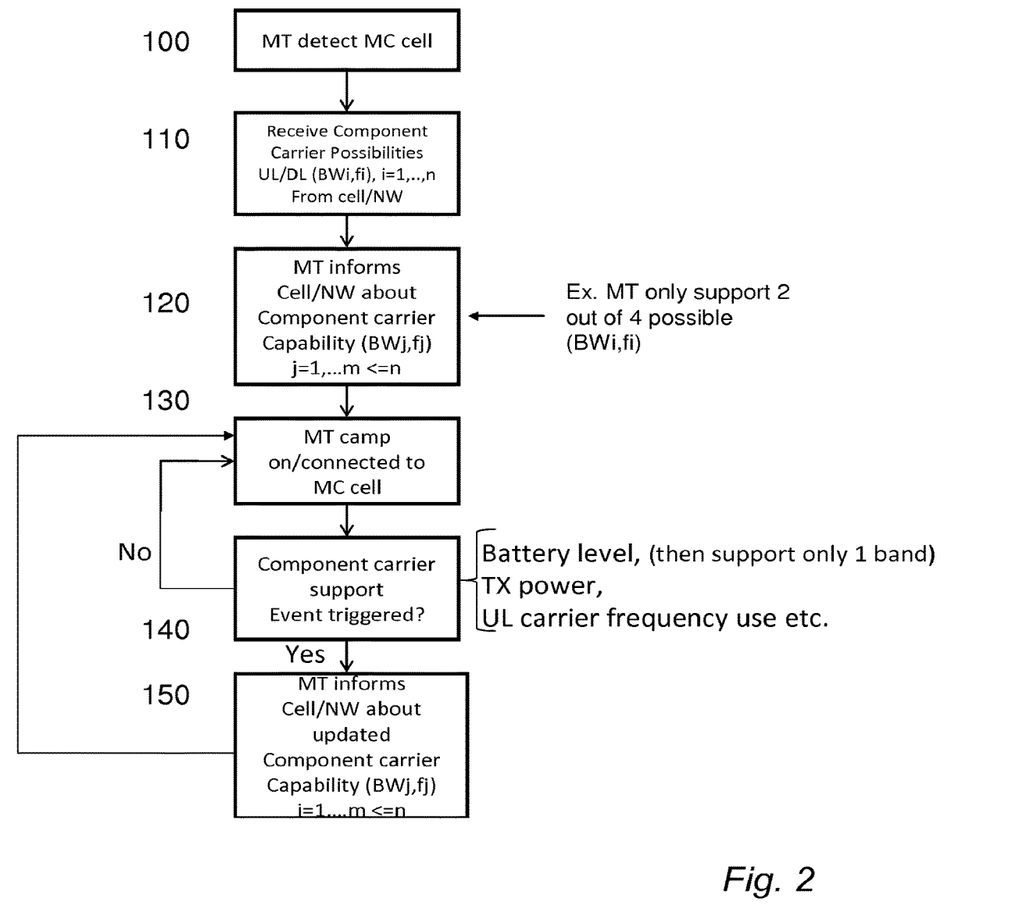
FIG. 2 is a flow diagram of a method of scheduling data transmissions between a mobile terminal and a base station.

FIG. 2 shows a flow chart of an embodiment of the present invention. The mobile terminal first, in step 100, detects a multi component carrier cell comprising a base station for communicating with the mobile terminal. This may be achieved by using a cell search procedure. The mobile terminal then, in step 110, receives information related to the component carrier possibilities of the multi component carrier cell. This information may include information related to the bandwidth and carrier frequencies, of the component carriers. The number of possible component carriers may be any number, including the special case when only a single component carrier is available. The mobile terminal then, in step 120, determines a subset of the available component carriers to use for transmitting and receiving data from and to the multi component carrier cell, and informs the multi component carrier cell about this subset. The choice may be based on the physical resources of the mobile terminal. The subset does not have to be a proper subset, meaning that the chosen subset may include all the possible component carriers received from the multi-carrier cell. Next the mobile terminal connects to the multi carrier cell, in step 130, and starts to monitor for component carrier events in step 140. Such and event may be related to any dynamic parameter, such as the battery level of the mobile terminal, the transmit power of the mobile terminal, the processing load of the mobile terminal, energy of interference signals, or data transfer requirements of application on the mobile terminal. The mobile terminal then, in step 150, chooses a new subset of the available component carriers, after detection of an event and informs the multi component carrier cell about the new subset.

In one embodiment the multi component carrier cell is given the opportunity to reject the requested subset of component carriers and may instead suggest a different subset.

The communication between the mobile terminal and the multi-carrier cell for the purpose of configuring the multi-carriers may be achieved by using a well defined signaling protocol, for instance the Radio Resource Control (RRC) protocol, the Medium Access Control (MAC) protocol or via layer 1 signaling.

Figure 3A:
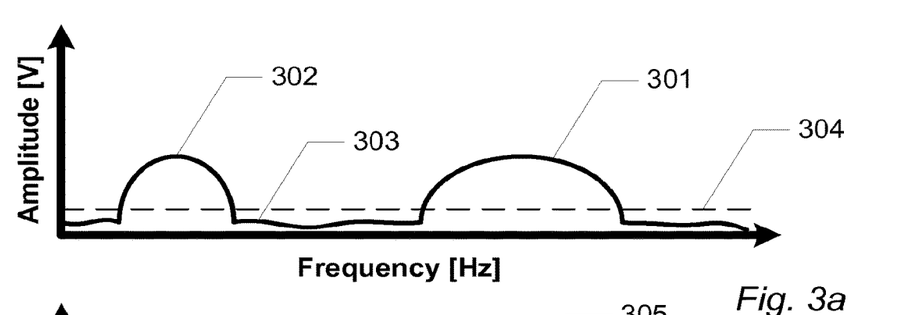
FIG. 3a is a frequency plot showing the spectrum leakage when transmitting multiple component carriers with low power.

FIG. 3a shows frequency leakage when transmitting with low power from a mobile terminal to a base station. The transmit power level is typically chosen based on a predetermined quality level requirement. Closed power loops are commonly used to adjust the transmit power. The loops function by monitoring, in the base station, the quality level of the transmission. If the quality level drops below a predetermined threshold, a control signal is sent from the base station to the mobile terminal, which in return increases the transmit power. Reversely, If the quality rises above a predetermined threshold, the base station signals to the mobile terminal which then decreases the transmit power. Two disperse component carriers 301, 302 are shown.

Nonlinearities in the transmitter and RF power amplifier result in intermodulation distortion, this leads to frequency leakage. This is especially a problem when using component carriers with a narrow bandwidth, since they have a high power density in the frequency domain, resulting in significant intermodulation distortion effects. To enable other users to use the bandwidth positioned outside the bandwidth of the used component carriers, strict frequency leakage requirements apply on mobile terminals. 303 shows the frequency leakage of the two component carriers 301, 302 and 304 shows the leakage requirement of the mobile network. The frequency leakage 303 of the two component carriers 301, 302 is below the leakage requirement 304 when the transmit power of the carriers is low.

Figure 3B:
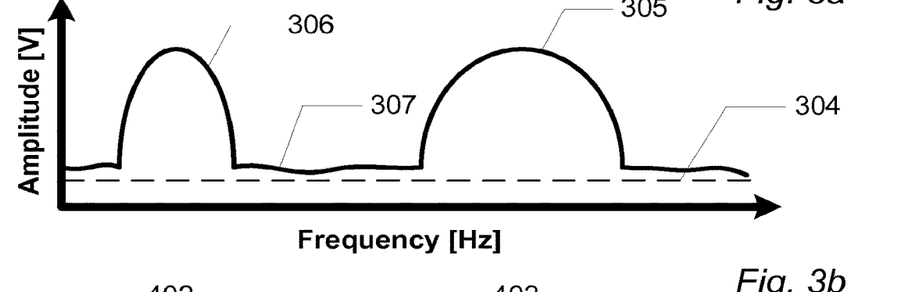
FIG. 3b is a frequency plot showing the spectrum leakage when transmitting multiple component carriers with high power.

FIG. 3b shows frequency leakage when transmitting with high power from a mobile terminal to a base station. Two disperse component carriers 305,306 are shown. They are positioned at the same frequencies as the two component carriers 301,302 in FIG. 3a, however due to the increased transmit power their amplitude is higher. The spectrum leakage of the two carriers 307 is now above the spectrum leakage requirement of the mobile network. Using a more linear transmitter and RF power amplifier, is a possible way to mitigate this, however highly linear components generally consumes more power and increases the complexity and cost of the mobile terminal.

Using an embodiment of the present invention, the number of component carriers may be controlled based on the transmit power of the individual carriers. One way of doing this is to decrease the number of component carriers used, when the transmit power is increased. Alternatively, use of component carriers with a narrow bandwidth may be limited, when transmitting with high power. This will enable multi-carrier support on mobile terminals without the need of costly hardware and with reasonable power consumption.

Figure 4:
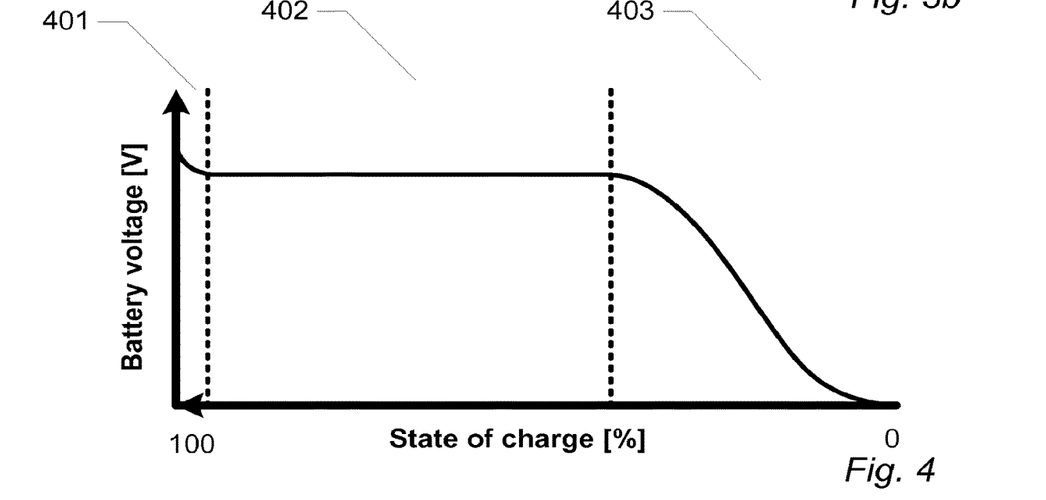
FIG. 4 is a plot showing the battery voltage as a function of the state of charge.

FIG. 4 shows a plot of the voltage, for a typical battery used in mobile terminals, as a function of the state of charge. The state of charge is varied from 0% to 100%. Three distinct phases are shown, an initialization phase 401, where the battery voltage drops a small amount, a plateau phase 402 where the battery voltage is almost unchanged, and a terminal phase 403, where the battery voltage falls to zero. The function of the mobile terminal is unaffected by the voltage changes in the initialization phase 401 and the plateau phase 402. However in the terminal phase the battery fails to support functionalities of the mobile terminal, and the mobile terminal is in the end forced to turn off. More linear transmitter blocks and in particular a more linear power amplifier are needed in a mobile terminal supporting multiple component carries, these however have a high power consumption. A mobile terminal supporting multiple component carriers will therefore cease to function relative early in the terminal phase.

However by using an embodiment of the present invention the number of component carriers may be controlled based on the state of charge of the battery in the mobile terminal. This may be done by decreasing the number of component carriers used, when the state of charge of the battery is low, thereby achieving both multi carrier support and a long battery life time, without the need of a complex and expensive architecture in the mobile terminal.

According to an embodiment of the invention the number of component carriers used may be controlled by a power management system functioning as a dynamic parameter. The power management system may function by estimating the power consumption of supporting multiple component carriers and determine the number of carriers to use in relation to the estimated power consumption. This may be done by limiting the number of component carriers used when the power consumption for supporting multiple component carriers is high. The state of charge of the battery in the mobile terminal may also be used as an input to the power management system. By using a power management system a longer battery life time is achieved.

Thereby multiple component carriers may be only be supported in situations where the power consumption for supporting them are relative low.

Figure 5A:
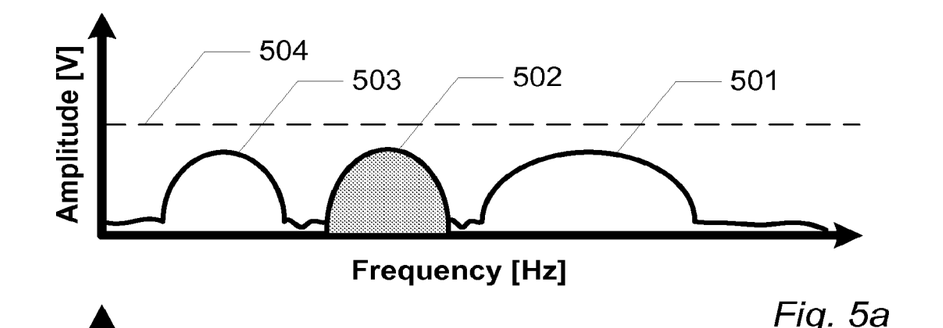
FIG. 5a is a frequency plot showing the amplitude of a low energy interference signal positioned between two component carriers prior to filtration.
Figure 5B:
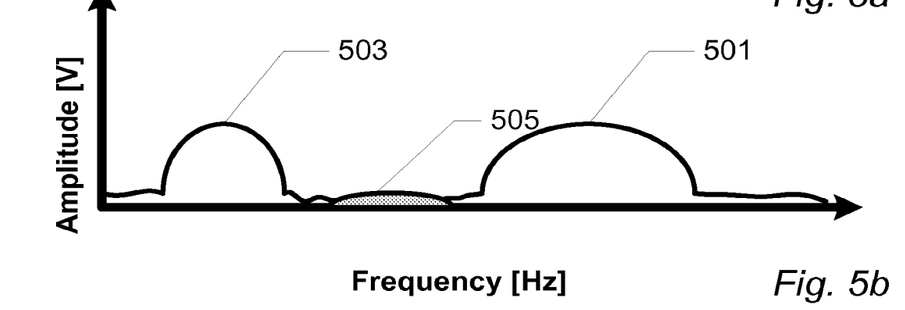
FIG. 5b is a frequency plot showing the amplitude of a low energy interference signal positioned between two component carriers after filtration.

FIG. 5a shows a frequency plot of a low energy interference signal 502 positioned between two component carriers 501,502 prior to filtration in a mobile terminal. 504 is a threshold showing the ability of the filters in the mobile terminal to block out interference signals. The threshold is determined by the quality of the filters in the mobile terminal. The interference signal 502 has an amplitude that is lower than the threshold 504. FIG. 5b shows a frequency plot of the same situation as depicted in FIG. 5a, after filtration in the mobile terminal. The power of the interference signal has been minimized to an insignificant level, and a good quality of service is achieved for the two component carriers 501,502.

Figure 6A:
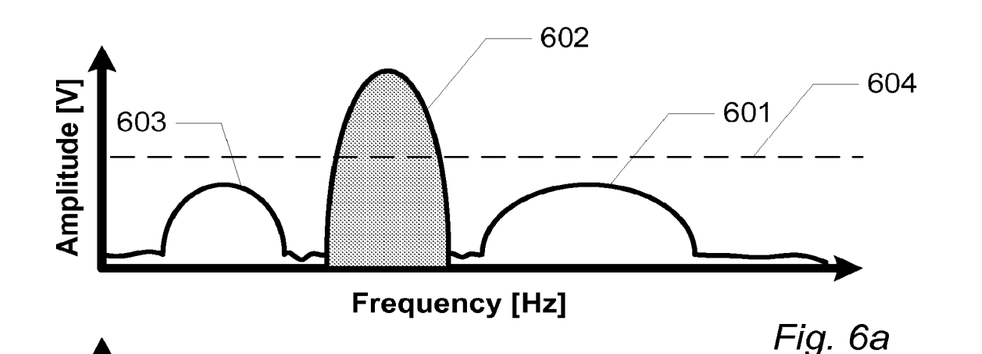
FIG. 6a is a frequency plot showing the amplitude of a high energy interference signal positioned between two component carriers prior to filtration.
Figure 6B:
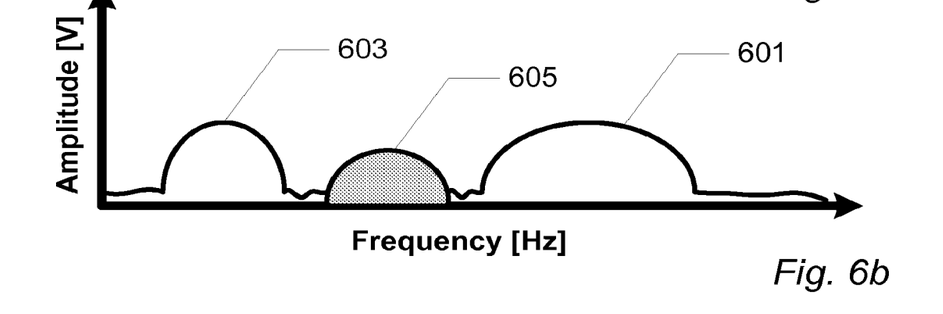
FIG. 6b is a frequency plot showing the amplitude of a high energy interference signal positioned between two component carriers after filtration.

FIG. 6a shows a frequency plot of a high energy interference signal 602 positioned between two component carriers 601,602 prior to filtration in a mobile terminal. 604 is a threshold showing the ability of the filters in the mobile terminal to block out interference signals. The amplitude of the interference is in this situation higher than the threshold 604. FIG. 6b shows a frequency plot of the same situation as depicted in FIG. 6a after filtration in the mobile terminal. The power of the interference signal has been lowered, but it remains relative high compared to the amplitude of the two component carriers 601,602 resulting in a poor quality of service of the carriers. This can be corrected by using high performance filters with a higher threshold; however this will again will both increase the total power consumption and increase the overall cost of the device.

Using an embodiment of the present invention, the number of used component carriers may be controlled based on the power of interference signals. This may be achieved by limiting the use of multi carrier components when high energy interference signals are present, thereby achieving good multi carrier support in the most common case, when no high energy interference signals are present, without the need of costly hardware to cope high energy interference signals.

Mobile terminals have transformed from being a simple communication tools into being a fully operational transportable computer system, providing a range of different applications such as audio and movie applications, maps, dictionaries and games. This evolution has increased the need for processing power in mobile terminals. Multi carrier component support further increases the overall processing load of the mobile terminal. Complicated application will therefore be processed slower when multi carrier components is used, resulting in a decreased user experience. By using an embodiment of the present invention, the number of component carriers used, may be controlled in relation to the processing load of the mobile terminal. This can be achieved by using fewer component carriers when processing complicated application, thereby securing a faster processing of complex application and an increased user experience.

Figure 7:
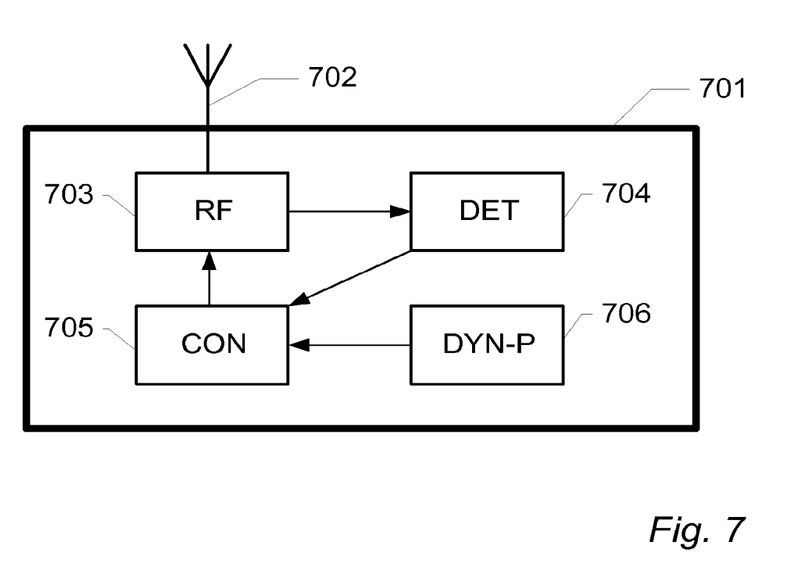
FIG. 7 is a functional block diagram of a mobile terminal.

FIG. 7 shows a functional block diagram of a mobile terminal 701 configured to schedule data transmissions between the mobile terminal and a base station in a wireless communications network using the principles of the present invention. The mobile terminal comprises an antenna 702 for communicating with the base station using RF signals. The RF signals from the antenna is received in the RF block 703 and transmitted to the DET block 704, where the mobile terminal 701 receives information from the base station indicating available component carriers. The mobile terminal then in block 706 detects at least one dynamic parameter indicative of the mobile terminal's current ability to handle component carriers, where the component carriers may form a contiguous or non-contiguous bandwidth. The at least one dynamic parameter detected in 706 together with the available component carriers detected in 704 are send to a control block 705 where the mobile terminal 701 determines a subset of the available component carriers to use for transmitting and receiving data from and to the base station, and informs the base station about this subset. The subset does not have to be a proper subset, meaning that the chosen subset may include all the possible component carriers received from the multi-carrier cell.

According to an embodiment of the present invention the number of component carriers used may be determined in relation to a combination of different dynamic parameters. The combination may be any combination of the following parameters; the battery level of the mobile terminal, the transmit power of the mobile terminal, the processing load of the mobile terminal, energy of interference signals, or data transfer requirements of application on the mobile terminal. E.g. a mobile terminal functioning accordingly to the present invention may control the number of component carries used in respect to both the battery level is and the transmit power.

Although various embodiments of the present invention have been described and shown, the invention is not restricted thereto, but may also be embodied in other ways within the scope of the subject-matter defined in the following claims.

The invention claimed is:

1. A method performed at a mobile terminal, comprising:
transmitting information indicating a capability of the mobile terminal for operating on a first number of aggregated component carriers for data transmission between the mobile terminal and a base station;
determining, at the mobile terminal, a change in at least one dynamic parameter relating to an operating state of the mobile terminal;
determining, based on the change in the at least one dynamic parameter in the mobile terminal, a reduction in the number of aggregated component carriers supported by the mobile terminal from the first number of aggregated component carriers to a second number of aggregated component carriers, the second number of aggregated component carriers being less than the first number of aggregated component carriers; and
transmitting, from the mobile terminal to the base station, an indication that the mobile terminal prefers to support the second number of aggregated component carriers for data transmission, wherein transmitting the indication comprises transmitting using a Radio Resource Control (RRC) signaling protocol.

2. The method of claim 1, wherein the first number of aggregated component carriers is a maximum number of component carriers the mobile terminal can support.

3. The method of claim 1, wherein the at least one dynamic parameter comprises one or more of a transmit power of the mobile terminal, a processing load of the mobile terminal, a charge level of a battery, energy of interference signals, or data transfer requirements of an application on the mobile terminal.

4. The method of claim 1, wherein the change in at least one dynamic parameter is a processing load of the mobile terminal passing a predefined threshold.

5. The method of claim 1, wherein the operating state is associated with a current ability of the mobile terminal to handle component carriers, and wherein the indication that the mobile terminal supports the second number of aggregated component carriers is prompted by the change in dynamic parameter.

6. The method of claim 1, wherein each aggregated component carrier is associated with a respective carrier frequency and a respective carrier bandwidth.

7. The method of claim 1, wherein the reduction from the first number of aggregated component carriers to the second number of aggregated component carriers results in a reduction in an amount of frequency resources.

8. The method of claim 1, further comprising, receiving, at the mobile terminal, information related to bandwidth and carrier frequencies of the component carriers.

9. A mobile terminal, comprising:
a battery; and
a processor configured to:
determine a first number of aggregated component carriers for the mobile terminal to support for data transmission;
determine a change in at least one dynamic parameter relating to an operating state of the mobile terminal;
determine, based on the change in the at least one dynamic parameter in the mobile terminal, a reduction of the number of aggregated component carriers supported by the mobile terminal from the first number of aggregated component carriers to a second number of aggregated component carriers, the second number of aggregated component carriers being less than the first number of aggregated component carriers; and transmit, to a base station, an indication that the mobile terminal prefers to support the second number of aggregated component carriers for data transmission, using a Radio Resource Control (RRC) signaling protocol.

10. The mobile terminal of claim 9, wherein the first number of aggregated component carriers is a maximum number of component carriers the mobile terminal can support.

11. The mobile terminal of claim 9, wherein the at least one dynamic parameter comprises one or more of a transmit power of the mobile terminal, a processing load of the mobile terminal, a charge level of a battery, energy of interference signals, or data transfer requirements of an application on the mobile terminal.

12. The mobile terminal of claim 9, wherein the change in at least one dynamic parameter is a processing load of the mobile terminal passing a predefined threshold.

13. The mobile terminal of claim 9, wherein the operating state is associated with a current ability of the mobile terminal to handle component carriers, and wherein the indication that the mobile terminal supports the second number of aggregated component carriers is prompted by the change in dynamic parameter.

14. The mobile terminal of claim 9, wherein each aggregated component carrier is associated with a respective carrier frequency and a respective carrier bandwidth.

15. The mobile terminal of claim 9, wherein the reduction from the first number of aggregated component carriers to the second number of aggregated component carriers results in a reduction in an amount of frequency resources.

16. The mobile terminal of claim 9, wherein the mobile terminal receives information related to bandwidth and carrier frequencies of the component carriers.

17. A mobile terminal, comprising:
a battery; and
a processor configured to:
operate using a first number of aggregated component carriers for data transmission;
determine a change in at least one dynamic parameter relating to an operating state of the mobile terminal;
determine, based on the change in the at least one dynamic parameter in the mobile terminal, a reduction in the number of aggregated component carriers supported by the mobile terminal from the first number of aggregated component carriers to a second number of aggregated component carriers, the second number of aggregated component carriers being less than the first number of aggregated component carriers; and
transmit, using a Radio Resource Control (RRC) signaling protocol, an indication that the mobile terminal prefers to support the second number of aggregated component carriers for data transmission.

18. The mobile terminal of claim 17, wherein the at least one dynamic parameter is one or more of a transmit power of the mobile terminal, a processing load of the mobile terminal, energy of interference signals, or data transfer requirements of an application on the mobile terminal.

19. The mobile terminal of claim 17, wherein each aggregated component carrier is associated with a respective carrier frequency and a respective carrier bandwidth.

20. The mobile terminal of claim 17, wherein the reduction from the first number of aggregated component carriers to the second number of aggregated component carriers results in a reduction in an amount of frequency resources.

* * * * *

UNITED STATES PATENT AND TRADEMARK OFFICE
CERTIFICATE OF CORRECTION

| | |
|---|---|
| PATENT NO. | : 11,133,902 B2 |
| APPLICATION NO. | : 16/891910 |
| DATED | : September 28, 2021 |
| INVENTOR(S) | : Lindoff et al. |

Page 1 of 1

It is certified that error appears in the above-identified patent and that said Letters Patent is hereby corrected as shown below:

In the Specification

Column 1, Line 63: replace "arc" with -- are --

Column 4, Line 65: replace "and" with -- an --

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*